United States Patent
Yu et al.

(10) Patent No.: US 7,734,460 B2
(45) Date of Patent: Jun. 8, 2010

(54) TIME ASYNCHRONOUS DECODING FOR LONG-SPAN TRAJECTORY MODEL

(75) Inventors: Dong Yu, Kirkland, WA (US); Li Deng, Sammamish, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1194 days.

(21) Appl. No.: 11/311,951

(22) Filed: Dec. 20, 2005

(65) Prior Publication Data

US 2007/0143112 A1 Jun. 21, 2007

(51) Int. Cl.
*G06F 17/21* (2006.01)
*G06F 17/27* (2006.01)
*G10L 15/00* (2006.01)

(52) U.S. Cl. ............... 704/9; 704/10; 704/243; 707/3

(58) Field of Classification Search .......... 704/9, 704/243
See application file for complete search history.

(56) References Cited

U.S. PATENT DOCUMENTS

| | | | |
|---|---|---|---|
| 6,501,833 B2* | 12/2002 | Phillips et al. | 379/88.07 |
| 7,403,941 B2* | 7/2008 | Bedworth et al. | 707/3 |
| 2005/0246172 A1* | 11/2005 | Huang | 704/243 |
| 2006/0074676 A1 | 4/2006 | Deng | 704/261 |
| 2006/0100862 A1 | 5/2006 | Deng | 704/207 |
| 2006/0200351 A1 | 9/2006 | Acero | 704/254 |

OTHER PUBLICATIONS

Seide, F. et al., "Coarticulation Modeling by Embedding a Target-Directed Hidden Trajectory Model into HMM -Map Decoding and Evaluation," Proc. ICASSP, 2003, pp. 748-751.*
Confidence based lattice segmentation and minimum Bayes-risk decoding—Goel, Kumar, et al.—Eurospeech 2001.*
Aubert 1995: X.L. Aubert, "An overview of decoding techniques for large vocabulary continuous speech recognition," Computer Speech and Language, vol. 16, pp. 89-114, 2002.
Bilmes 2004: J. Bilmes. "Graphical models and automatic speech recognition," in M. Johnson, M. Ostendorf, S. Khudanpur, and R. Rosenfeld (eds.) in Mathematical Foundations of Speech and Language Processing, Springer-Verlag, New York, 2004, pp. 135-186.
Bridle et al. 1998: J. Bridle, L. Deng, J. Picone J. et al. "An Investigation of segmental hidden dynamic models of speech coarticulation for automatic speech recognition," Final Report for the 1998 Workshop on Language Engineering, Center for Language and Speech Processing at Johns Hopkins University, 1998, pp. 1-61.
Buzen 1973: J. Buzen, "Computational algorithms for closed queueing networks with exponential servers," Communications of the ACM, vol. 16, No. 9, 1973, pp. 527-531.

(Continued)

*Primary Examiner*—David R Hudspeth
*Assistant Examiner*—Justin W Rider
(74) *Attorney, Agent, or Firm*—Joseph R. Kelly; Westman, Champlin & Kelly, P.A.

(57) ABSTRACT

A time-asynchronous lattice-constrained search algorithm is developed and used to process a linguistic model of speech that has a long-contextual-span capability. In the algorithm, nodes and links in the lattices developed from the model are expanded via look-ahead. Heuristics as utilized by a search algorithm are estimated. Additionally, pruning strategies can be applied to speed up the search.

13 Claims, 6 Drawing Sheets

OTHER PUBLICATIONS

Chelba and Jelinek 2000: C. Chelba and F. Jelinek. "Structured language modeling," Computer Speech and Language, Oct. 2000, pp. 283-332.

Deng and Braam 1994: L. Deng and D. Braam, "Context-dependent Markov model structured by locus equations: Applications to phonetic classification," J. Acoust. Soc. Am., vol. 96.

Deng 1998: L. Deng. "A dynamic, feature-based approach to the interface between phonology and phonetics for speech modeling and recognition," Speech Communication, vol. 24, No. 4, 1998 pp. 299-323.

Deng 2004: L. Deng. "Switching dynamic system models for speech articulation and acoustics," in M. Johnson, M. Ostendorf, S. Khudanpur, and R. Rosenfeld (eds.) in Mathematical Foundations of Speech and Language Processing, Springer-Verlag, New York, 2004, pp. 115-134.

Deng et al. 2004a: L. Deng, L. Lee, H. Attias, and A. Acero. "A structured speech model with continuous hidden dynamics and prediction-residual training for tracking vocal tract resonances," IEEE Proc. ICASSP, May 2004, vol. I.

Deng et al. 2004b: L. Deng, A. Acero, and I. Bazzi. "Tracking vocal tract resonances using a quantized nonlinear function embedded in a temporal constraint," IEEE Trans. Speech & Audio Processing, accepted 2004.

Deng et al. 2004c: L. Deng, D. Yu, and A. Acero, "A quantitative model for formant dynamics and contextually assimilated reduction in fluent speech", ICSLP 2004, Jeju, Korea, 2004.

Deng et al. 2004d: L. Deng, D. Yu, and A. Acero, "A bi-directional target-filtering model of speech coarticulation and reduction: Two-stage implementation for phonetic recognition", IEEE Trans. Speech & Audio Processing, accepted 2004.

Deng et al. 2004e: L. Deng, D. Yu, A. Acero, "A quantitative model for formant dynamics & contextually assimilated reduction in fluent speech," Proc. ICSLP, pp. 719-722, Jeju, Korea, 2004.

Deng et al. 2005a: L. Deng, X. Li, D. Yu, & A. Acero, "A Hidden Trajectory Model with Bi-directional Target-Filtering: Cascaded vs. Integrated Implementation for Phonetic Recognition" Proc. ICASSP, pp. 337-340, 2005, Philadelphia, PA, USA.

Deng et al. 2005c: L. Deng, D. Yu, and A. Acero "Learning statistically characterized resonance targets in a hidden trajectory model of speech coarticulation and reduction," in Proc. Interspeech 2005, Lisbon, Sep. 2005, pp. 1097-1100.

Deng et al. 2005d: L. Deng, D. Yu, and A. Acero. "A long-contextual-span model of resonance dynamics for speech recognition: parameter learning and recognizer evaluation", ASRU 2005 (to appear).

Eide and Gish 1996: E. Bide and H. Gish, "A parametric approach to vocal tract length normalization," IEEE Proc. ICASSP, pp. 346-348, 1996.

Gao et al. 2000: Y. Gao, R. Bakis, J. Huang, and B. Zhang, "Multistage coarticulation model combining articulatory, formant and cepstral features".

Glass 2003: J. Glass. "A probabilistic framework for segment-based speech recognition," in Computer Speech and Language, vol. 17, 2003, pp. 137-152.

Goel and Byrne 1999: V. Goel and W. Byrne, "Task dependent loss functions in speech recognition: A-star search over recognition lattices", In Proc. EUROSPEECH 99, 1999.

Kamm et al. 1995: T. Kamm, G. Andreou, and J. Cohen, "Vocal tract normalization in speech recognition: Compensating for systematic speaker variability," *Proc. of the 15th Annual Speech Research Symposium*, pp. 161-167, CLSP, Johns Hopkins University, Baltimore, MD, Jun. 1995.

Hamme and Van Aelten 1996: H. Van Hamme and F. Van Aelten, "An adaptive-beam pruning technique for continuous speech recognition," in Proceedings of ICSLP, 1996, pp. 2083-2086.

Holmes and Russel 1999: W. Holmes and M. Russell. "Probabilistic-trajectory segmental HMMs," Computer Speech and Language, vol. 13, 1999, pp. 3-37.

Klatt 1980: D. Klatt. "Software for a cascade/parallel formant synthesizer," J. Acoust. Soc. Am., vol. 99, No. 3, 1980, pp. 971-995.

Lee and Rose 1998: L. Lee and R. Rose, "A frequency warping approach to speaker normalization," IEEE Trans. Speech & Audio Processing, vol. 6, pp. 49-60, Jan. 1998.

Little 1961: J. Little, "A proof for the queuing formula: $L = \lambda W$," Operations Research, vol. 9, No. 3, May-Jun. 1961, pp. 383-387.

Ma and Deng 2003: J. Ma and L. Deng. "Efficient decoding strategies for conversational speech recognition using a constrained nonlinear state-space model for vocal-tract-resonance dynamics," IEEE Trans. Speech & Audio Proc., vol. 11, 2003, pp. 590-602.

McDonough et al. 1998: J. McDonough, W. Byrne, and X. Luo, "Speaker normalization with all-pass transforms," Proc. ICSLP, vol. 6, pp. 2307-2310, 1998.

Naito et al. 2002: M. Naito, L. Deng, and Y. Sagisaka. "Speaker clustering for speech recognition using vocal-tract parameters," Speech Communication, vol. 36, No. 3-4, Mar. 2002, pp. 305-315.

Odel 1995: J. J. Odell, "The use of context in large vocabulary speech recognition," Ph.D. dissertation, Queens' college, 1995.

Ortmanns and Ney 2000: S. Ortmanns and H. Ney, "Look-ahead techniques for fast beam search," Computer Speech and Language, vol. 14, pp. 15-32, 2000.

Ostendorf et al. 1996: M. Ostendorf, V. Digalakis, and J. Rohlicek. "From HMMs to segment models: A unified view of stochastic modeling for speech recognition" IEEE Trans. Speech & Audio Proc., vol. 4, 1996, pp. 360-378.

Pyen and Woodland 1997: D. Pye and P.C. Woodland, "Experiments in speaker normalisation and adaptation for large vocabulary speech recognition", IEEE Proc. ICASSP, pp. 1047-1050, 1997.

Rose et al. 1996: R. Rose, J. Schroeter, and M. Sondhi. "The potential role of speech production models in automatic speech recognition," J. Acoust. Soc. Am., vol. 99, 1996, pp. 1699-1709.

Russell and Norvig 1995: S. Russell, and P. Norvig, "Artificial Intelligence: A Modern Approach", Prentice Hall, Englewood Cliffs, 1995.

Sevcik and Mitrani 1981: K. Sevcik and I. Mitrani, "The distribution of queuing network states at input and output instants," J. Assoc. Computing Machinery, vol. 28, No. 2, Apr. 1981, pp. 358-371.

Siivola et al. 2003: V. Siivola, T. Hirsimaki, M. Creutz, and M. Kurimo, "Unlimited vocabulary speech recognition based on morphs discovered in an unsupervised manner," in Proceedings of Eurospeech, 2003, pp. 2293-2296.

Sun and Deng 2002: J. Sun and L. Deng. "An overlapping-feature based phonological model incorporating linguistic constraints: Applications to speech recognition," J. Acoust. Soc. Am., vol. 111, No. 2, Feb. 2002, pp. 1086-1101.

Wang et al. 2004: w. Wang, A. Stolcke, and M. Harper. "The use of a linguistically motivated language model in conversational speech recognition," IEEE Proc. ICASSP, May 2004.

Wegmann et al. 1996: S. Wegmann, D. McAllaster, J. Orloff, and B. Peskin, "Speaker normalization on conversational telephone speech," IEEE Proc. ICASSP, pp. 339-341, 1996.

Welling et al. 1998: L. Welling and R. Haeb-Umbach and X. Aubert and N. Haberland, "A study on speaker normalization using vocal tract normalization and speaker adaptive training", IEEE Proc. ICASSP, vol. 2, pp. 797-800, Seattle, WA, May 1998.

Yu et al. 2005: D. Yu, L. Deng, and A. Acero. "Evaluation of a long-contextual-span trajectory model and phonetic recognizer using A* lattice search", in Proc. Interspeech, Lisbon, Sep. 2005, pp. 553-556.

Zhan and Westphal 1997: P. Zhan and M. Westphal, "Speaker normalization based on frequency warping," IEEE Proc. ICASSP, 1997, pp. 1039-1042.

Zhan and Waibel 1997: P. Zhan and A. Waibel, "Vocal tract length normalization for large vocabulary continuous speech recognition," *CMU-CS-97-148*, Carnegie Mellon University, Pittsburgh, PA, May 1997.

Zhou et al. 2003: J. Zhou, F. Seide, and L. Deng. "Coarticulation modeling by embedding a target-directed hidden trajectory model into HMM," IEEE Proc. ICASSP, Apr. 2003, vol. I, pp. 744-747.

\* cited by examiner

TIME ASYNCHRONOUS DECODING FOR LONG-SPAN TRAJECTORY MODEL

BACKGROUND

The discussion below is merely provided for general background information and is not intended to be used as an aid in determining the scope of the claimed subject matter.

A pattern recognition system, such as a speech recognition system or a handwriting recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

Many pattern recognition systems utilize models in which units are represented by a single tier of connected states. Using a training signal, probability distributions for occupying the states and for transitioning between states are determined for each of the units. In speech recognition, phonetic units are used. To decode a speech signal, the signal is divided into frames and each frame is transformed into a feature vector. The feature vectors are then compared to the distributions for the states to identify a most likely sequence of states that can be represented by the frames. The phonetic unit that corresponds to that sequence is then selected.

SUMMARY

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

A time-asynchronous lattice constrained search algorithm can be used to decode a hidden trajectory model (HTM). In the algorithm, nodes and links in the lattices developed from other speech recognition decoders are expanded via look-ahead, and heuristics associated with a search process utilized by an A* algorithm are estimated. Additionally, pruning strategies can be applied to speed up the search.

DETAILED DESCRIPTION

Figure 1:
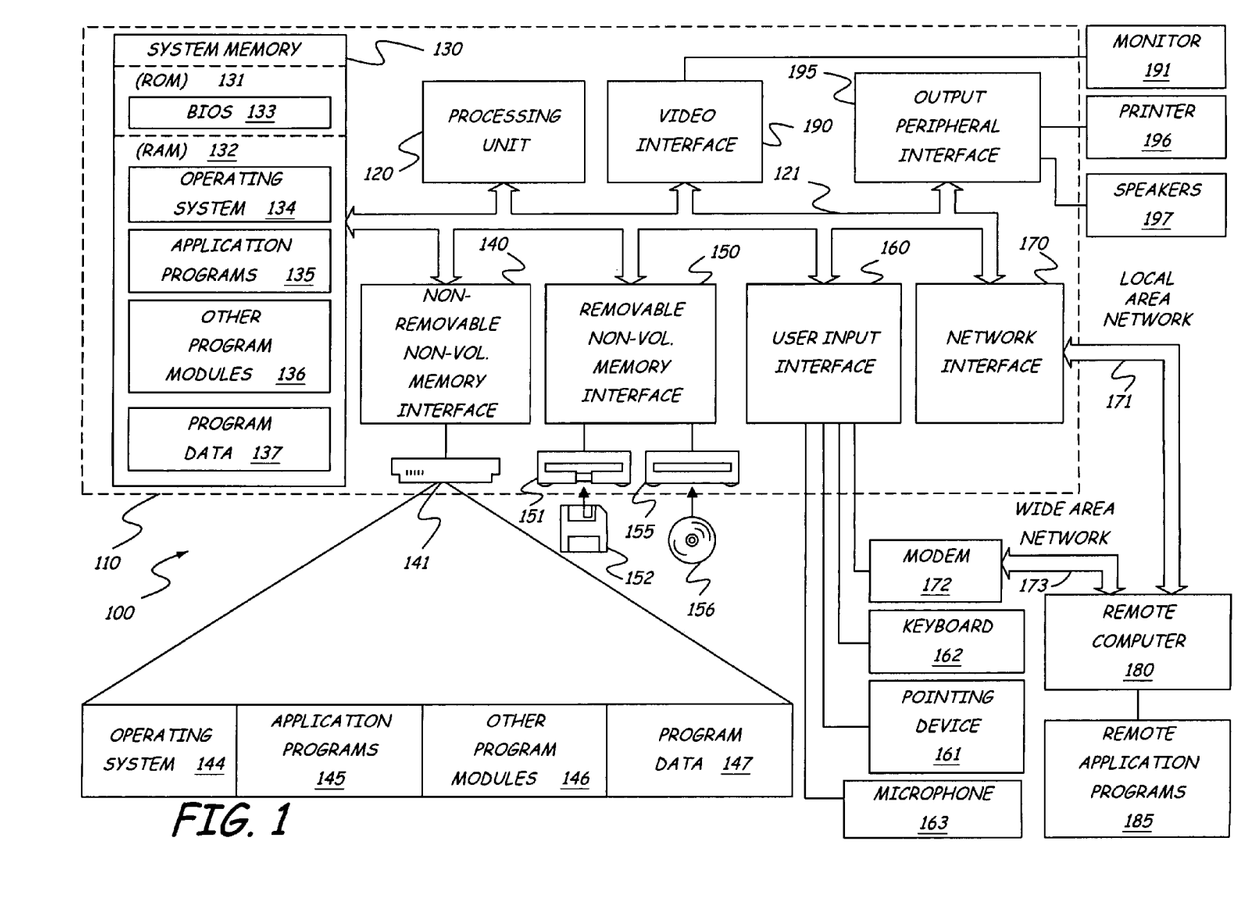
FIG. 1 is a block diagram of a computing environment.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
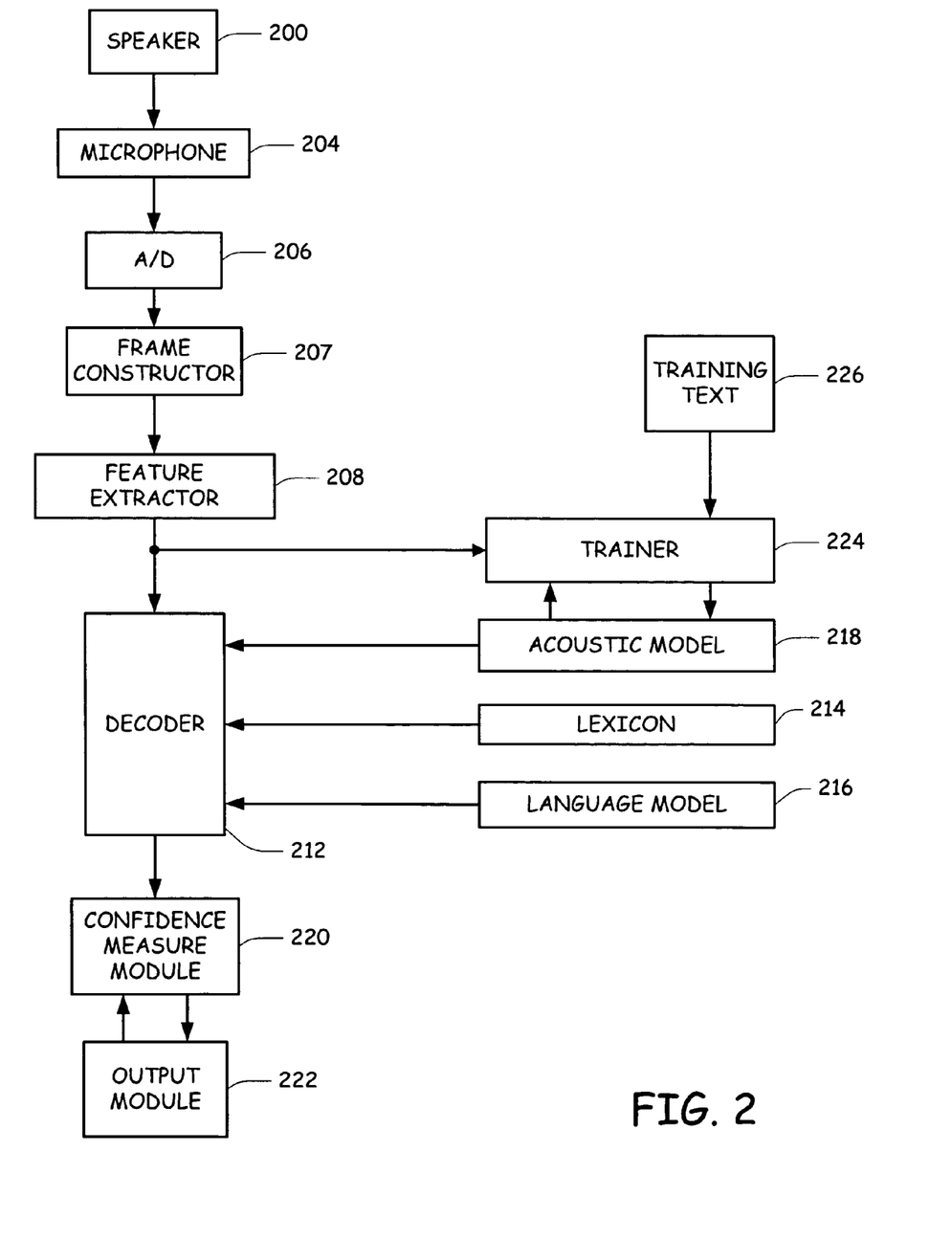
FIG. 2 is a block diagram of a speech recognition system.

FIG. 2 provides a block diagram of a speech recognition system 200. In FIG. 2, a speaker 202, either a trainer or a user, speaks into a microphone 204. The audio signals detected by microphone 204 are converted into electrical signals that are provided to analog-to-digital converter 206.

A-to-D converter 206 converts the analog signal from microphone 204 into a series of digital values. In several embodiments, A-to-D converter 206 samples the analog signal at 16 kHz and 16 bits per sample, thereby creating 32 kilobytes of speech data per second. These digital values are provided to a frame constructor 207, which, in one embodiment, groups the values into 25 millisecond frames that start 10 milliseconds apart.

The frames of data created by frame constructor 207 are provided to feature extractor 208, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that system 200 is not limited to these feature extraction modules and that other modules may be used within the context of system 200.

The feature extraction module 208 produces a stream of feature vectors that are each associated with a frame of the speech signal. This stream of feature vectors is provided to a decoder 212, which identifies a most likely sequence of words based on the stream of feature vectors, a lexicon 214, a language model 216 (for example, based on an N-gram, context-free grammars, or hybrids thereof), and an acoustic model 218.

The most probable sequence of hypothesis words is provided to a confidence measure module 220. Confidence measure module 220 identifies which words are most likely to have been improperly identified by the speech recognizer, based in part on a secondary acoustic model (not shown).

Confidence measure module 220 then provides the sequence of hypothesis words to an output module 222 along with identifiers indicating which words may have been improperly identified. Those skilled in the art will recognize that confidence measure module 220 is not necessary for the operation of system 200.

During training, a speech signal corresponding to training text 226 is input to decoder 212, along with a lexical transcription of the training text 226. Trainer 224 trains acoustic model 218 based on the training inputs. Acoustic model 218 is intended to be one example implementation of a model. Other types of pattern recognition systems can utilize the subject matter described herein, namely handwriting recognition systems.

Modeling long-span contextual effects in speech acoustics is useful in speech recognition, especially for recognizing spontaneous speech, where phonetic reduction and coarticulation are often mixed. In one example, a long-contextual-span hidden trajectory model (HTM) is used as acoustic model 218 and is based on a bi-directional target filtering approach to modeling speech coarticulation and context assimilated reduction. One such model is discussed in an article authored by L. Deng, X. Li, D. Yu, and A. Acero and entitled, "A Hidden Trajectory Model with Bi-directional Target-Filtering: Cascaded vs. Integrated Implementation for Phonetic Recognition", Proc. ICASSP, pp. 337-340, 2005, Philadelphia, Pa., USA.

In one example HTM model, each phone in the HTM phone set is assumed to have a single target which follows a Gaussian distribution. Vocal Tract Resonance (VTR) trajectories are obtained by filtering a target sequence through a bi-directional non-causal filter and treated as hidden vectors. A nonlinear prediction with statistical residuals generates cepstral parameters from the VTR trajectories. The statistical characterization of HTM allows for straightforward computation of a model likelihood score for cepstral observation data given the phone sequence and phone segment boundaries.

This bi-directional filter based HTM functionally achieves both anticipatory and regressive coarticulation, while leaving phonological units as a linear phonemic sequence and bypassing the use of more elaborate nonlinear phonological constructs. Different from other types of acoustic models such as Hidden Markov Model (HMM), the HTM uses a compact set of context-independent parameters to represent long-span contextual effects in the acoustic model through the technique of parametric filtering on VTR. In other words, the HTM can model longer context dependencies without introducing additional parameters.

The long-contextual-span nature of the HTM, however, presents special challenges for decoding—the search space increases dramatically and the nodes in the search space can span a variable number of phones and frames. An A* based time-asynchronous lattice rescoring search algorithm can be used for evaluating the HTM. In this algorithm, nodes and arc in the lattices are expanded via look-ahead, A* heuristics are estimated. Additionally, pruning strategies can be applied to speed up the search. Prior to discussing lattice rescoring, an example HTM is discussed.

The Hidden Trajectory Model

One hidden trajectory model (HTM) involves three steps. In the first step, a phone sequence hypothesis is mapped into an HTM phone sequence and its corresponding VTR targets based on the phone segment information. In the second step, the model predicts the VTR trajectory of the phone sequence hypothesis by applying a bi-directional filter on the targets. In the third step, the model converts the estimated VTR trajectory into the cepstral trajectory with a non-linear formula. A likelihood score is then calculated by comparing the estimated cepstral trajectory with the cepstrum derived directly from the wave form. The system can conduct these steps one by one, wherein the targets are considered as a fixed value for each phone. When taking into consideration the VTR target variances and considering the VTR trajectories as hidden variables when computing the likelihood, an integrated calculation of the likelihood score can be used.

Transfer a Phone Sequence to Targets

To predict the VTR trajectory of a phone sequence, phones are converted into an HTM phone set. Any source phone set can be used. One particular source phone set is referred to as the TIMIT (Texas Instrument/Massachusetts Institute of Technology) phone set. Table 1 shows transformation rules for the TIMIT phone set to an HTM phone set. There are four types of phones in Table 1. The first type of phones keeps its original phone name. For example, phone sh is mapped to sh in the HTM phone set. The second type of phones maps to different phones based on the phone that follows it. If the next phone is one of the front vowels (i.e., ae, eh, ih, iy, y, and ey), the phone is mapped to the front version of the phone. Otherwise, the phone is mapped to the same phone. For example, phone b may be mapped to phone b_f or b based on the next phone. The third type of the phones is the composite phone. Composite phones are split into two HTM phones at the middle of the segment. For example, phone aw becomes aw1 and aw2 in the HTM phone set. The fourth type of phones transform to the HTM phone based on the specific rules defined in Table 1. For example, phone gcl becomes HTM phone vcl.

TABLE 1

MAP ORIGINAL PHONE SET TO HTM PHONE SET

| Type | Description | Original Phone | Convertion Rule |
|---|---|---|---|
| 1 | Phones unchanged after the mapping | d, t, dx, vcl, cl, s, sh, z, zh, th, dh, n, l, r, w, y, hh, iy, ih, eh, ae, aa, ah, uh, uw, er, ax, sil, sp | ph → ph |
| 2 | Phones mapped to different HTM phones based on the phone follows it | b, g, p, f, k, m, ng, v | if ph ∈ {ae, eh, ih, iy, y, ey1} ph → ph_f otherwise ph → ph |
| 3 | Composite phones | jh, ch, ey, aw, ay, oy, ow, | ph → ph1 + ph2 |
| 4 | Phones follow specific conversion rules | q, kcl, pcl, tcl | ph → cl |
| | | bcl, dcl, gcl | ph → vcl |
| | | em | ph → m |
| | | En, nx | ph → n |
| | | eng | ph → eng |
| | | hv | ph → hh |
| | | el | ph → l |
| | | ao | ph → aa |
| | | ux | ph → uw |
| | | ix, ax-h | ph → ax |
| | | axr | ph → er |
| | | pau, h#, <s>, </s> | ph → sil |
| | | epi | ph → sp |

Once the phones are transformed into HTM phones, each phone S (except phones sil, cl, vcl, hh, and sp which inherit targets from the phone that follows it) is associated with a multidimensional target vector $t_s$ that follows a Gaussian distribution:

$$p(t_s)=p(t|s)=N(t;\mu_{T_s},\Sigma_{T_s}), \quad (1)$$

where $\mu_{T_s}$ is the mean of the Gaussian distribution, and $\Sigma_{T_s}$ is the variance of the Gaussian distribution. Each target t consists of P resonant frequencies f followed by P bandwidths b. That is, $$t = \begin{pmatrix} f \\ b \end{pmatrix}, \qquad (2)$$

where $$f = \begin{pmatrix} f_1 \\ f_2 \\ \vdots \\ f_P \end{pmatrix} \text{ and } b = \begin{pmatrix} b_1 \\ b_2 \\ \vdots \\ b_P \end{pmatrix}. \qquad (3)$$

Thus, given the phone sequence and its boundaries, a sequence of targets can be formed that is a function of discrete time and jumps at the segments' boundaries. Mathematically, the target sequence can be represented as a sequence of stepwise constant functions with variable durations and heights:

$$t(k) = \sum_{i=1}^{I} [u(k - k_{s_i}^l) - u(k - k_{s_i}^r)] t_{s_i}, \qquad (4)$$

where $u(k)$ is the unit step function, $k_s^r$, $s=s_1, s_2, \ldots, s_I$ are the right boundary sequence of the P segments in the utterance, and $k_s^l$, $s=s_1, s_2, \ldots, s_I$ are the left boundary sequence. In general, $k_{s_{i+1}}^l = k_{s_i}^r$ for $1 \leq i < I$. The difference of the two gives the duration sequence. $t_s$, $s=s_1, s_2, \ldots, s_I$ are the target vectors for segment s.

Convert Targets to VTR Trajectories

The target sequence is taken as input of a slowly time-varying, bi-directional FIR filter to estimate the VTR trajectories. This filter is characterized by the following non-causal, vector-valued, impulse response function:

$$h_s(k) = \begin{cases} c\gamma_{s(k)}^{-k} & -D < k < 0 \\ c & k = 0 \\ c\gamma_{s(k)}^{k} & 0 < k < D, \end{cases} \qquad (5)$$

where k represents time frame, each of which is typically 10 msec, $\gamma_{s(k)}$ is the stiffness parameter vector, one component for each VTR order (which spans F1-F4 in our case). Each component of the stiffness vector is a positive real value between zero and one. The subscript $s(k)$ in $\gamma_{s(k)}$ indicates that the stiffness vector is dependent on the segment state $s(k)$ which varies over time. D in equation (5) is a unidirectional length of the impulse response, representing the temporal extent of coarticulation in the temporal direction, assumed for simplicity to be equal in length for the forward direction (anticipatory coarticulation) and the backward direction (regressive coarticulation).

In equation (5), c is the normalization constant to ensure that the filter weights add up to one. For simplicity, we make the assumption that over the temporal span $-D \leq k \leq D$, the stiffness parameter's value stays approximately constant:

$$\gamma_s(k) \approx \gamma_{s(0)}. \qquad (6)$$

That is, the adjacent segments within the temporal span 2D+1 in length which contribute to the coarticulated home segment have the same stiffness parameter value as that of the home segment. Under this assumption, c can be determined by requiring that the filter coefficients sum to one:

$$\sum_{k=-D}^{D} h_s(k) = c \sum_{k=-D}^{D} \gamma_{s(k)}^{|k|} \qquad (7)$$

$$\approx c[1 + 2(\gamma_{s(0)} + \gamma_{s(0)}^2 + \ldots + \gamma_{s(0)}^D)].$$

$$= c \frac{1 + \gamma_{s(0)} - 2\gamma_{s(0)}^{D+1}}{1 - \gamma_{s(0)}} = 1$$

Thus, $$c_\gamma = c_{\gamma_{s(0)}} \approx \frac{1 - \gamma_{s(0)}}{1 + \gamma_{s(0)} - 2\gamma_{s(0)}^{D+1}}. \qquad (8)$$

Given the filter's impulse response and the input to the filter, the filter's output as the model's prediction for the VTR trajectories is the convolution between these two signals. The result of the convolution within the boundaries of the home segment s is:

$$z_s(k) = h_{s(k)} \otimes t(k) = \sum_{\tau=k-D}^{k+D} c(\gamma_{s(\tau)}) t_{s(\tau)} \gamma_{s(\tau)}^{|k-\tau|}, \qquad (9)$$

where the input target vector and the filter's stiffness vector may take not only values associated with the current home segment, but also those associated with the adjacent segments since the time τ in equation (9) can go beyond the home segment's boundaries.

A sequential concatenation of all outputs $z_s(k)$, $s=s_1, s_2, \ldots, s_p$ constitutes the model prediction of VTR trajectories for the entire utterance:

$$z(k) = \sum_{i=1}^{P} [u(k - k_{s_i}^l) - u(k - k_{s_i}^r)] z_{s_i}(k). \qquad (10)$$

Note that the convolution operation above carried out by the filter in the model guarantees continuity of the trajectories at each junction of two adjacent segments, contrasting the discontinuous jump in the input to the filter at the same junction. This continuity is applied to all classes of speech sounds including consonantal closure. This provides the mechanism for coarticulation and VTR target undershooting in the current hidden trajectory model.

The bi-directional filter gives rise to both forward and backward coarticulation, since it makes the VTR value at each time dependent on not only the current phone's VTR target but also on the VTR targets of the adjacent phones. This filtering process has been shown to give quantitative prediction of the magnitude of contextually assimilated reduction and coarticulation.

Since the VTR vector $z(k)$ (at each frame k) is a linear function of the targets t that follows a Gaussian distribution, $z(k)$ is a Gaussian as well:

$$p(z(k)|s) = N[z(k); \mu_{z(k)}, \Sigma_{z(k)}], \qquad (11)$$

whose mean vector $\mu_{z(k)}$ is:

$$\mu_{z(k)} = \sum_{\tau=k-D}^{k+D} c_\gamma \gamma_{s(\tau)}^{|k-\tau|} \mu_{T_{s(\tau)}} = a_k \cdot \mu_{T_{s(\tau)}}, \quad (12)$$

and the covariance matrix is:

$$\Sigma_{z(k)} = \sum_{\tau=k-D}^{k+D} c_\gamma^2 \gamma_{s(\tau)}^{2|k-\tau|} \Sigma_{T_{s(\tau)}} = v_k \cdot \Sigma_{T_{s(\tau)}}. \quad (13)$$

In our current implementation, both the target covariance matrix $\Sigma_{T_s}$ and the VTR vector covariance matrix $\Sigma_{z(k)}$ for each phone segment are approximated by a diagonal matrix.

Convert VTR Trajectories to Cepstral Trajectories

The mapping between the VTR vector $z(k)$ at each time frame k and the estimated corresponding vector of LPC cepstra $\hat{o}(k)$ can be represented by $$\hat{o}_j(k) = F_j(k) = \frac{2}{j} \sum_{p=1}^{P} e^{-\pi j \frac{b_p(k)}{f_s}} \cos\left(2\pi j \frac{f_p(k)}{f_s}\right), \quad (14)$$

where P is the highest VTR order (P=4 in the current implementation) and $f_s$ is the sampling rate (e.g., $f_s$=16000 in the TIMIT dataset).

The cepstral prediction's residual vector can be modeled as:

$$r_s(k) = o(k) - F[z(k)], \quad (15)$$

as a Gaussian distribution $$p(r_s(k)|z(k),s) = N[r_s(k); \mu_{r_s(k)}, \Sigma_{r_s(k)}], \quad (16)$$

whose mean vector is $\mu_{r_s(k)}$ and the covariance matrix is $\Sigma_{r_s(k)}$. The conditional distribution of the observation is thus:

$$p(o(k)|z(k),s) = N[o(k); F[z(k)] + \mu_{r_s(k)}, \Sigma_{r_s(k)}]. \quad (17)$$

In order to compute the acoustic observation likelihood, the nonlinear mean function of F[z(k)] is linearized by using the first-order Taylor series approximation:

$$F[z(k)] \approx F[z_0(k)] + F'[z_0(k)](z(k) - z_0(k)), \quad (18)$$

where the components of Jacobian matrix F'[.] can be computed in a closed form of $$F'_j[f_p(k)] = -\frac{4\pi}{f_s} e^{-\pi j \frac{b_p(k)}{f_s}} \sin\left(2\pi j \frac{f_p(k)}{f_s}\right), \quad (19)$$

for the VTR frequency components of z, and $$F'_j[b_p(k)] = -\frac{2\pi}{f_s} e^{-\pi j \frac{b_p(k)}{f_s}} \cos\left(2\pi j \frac{f_p(k)}{f_s}\right), \quad (20)$$

for the bandwidth components of z.

Thus:

$$p(o(k)|z(k),s) \approx N[o(k); \mu_{o_s(k)}, \Sigma_{r_s(k)}], \quad (21)$$

where $$\mu_{o_s(k)} = F'[z_0(k)]z(k) + (F[z_0(k)] - F'[z_0(k)]z_0(k) + \mu_{r_s(k)}) \quad (22)$$

Calculate the Likelihood Score

The likelihood value of acoustic observation vectors o(k) given the phone sequence hypothesis is calculated. Once the model knows the likelihood for each possible phone sequence, the model can simply output the phone sequence with the highest likelihood as the recognition result, i.e., $$\hat{w} = \underset{w}{\operatorname{argmax}}\, p(o|w). \quad (23)$$

When computing the HTM likelihood score, VTR values z(k) are treated as hidden variables which are marginalized (i.e., integrated over) in the likelihood computation. The final result of the computation is as follows:

$$p(o(k)|s) = \int p[o(k)|z(k),s] p[z(k)|s] dz \quad (24)$$
$$= N[o(k); \bar{\mu}_{o_s(k)}, \bar{\Sigma}_{o_s(k)}],$$

where the time-varying mean vector is $$\bar{\mu}_{o_s(k)} = F[z_0(k)] + F'[z_0(k)][a_k \cdot \mu_T - z_0(k)] + \mu_{r_s(k)}, \quad (25)$$

and the time-varying covariance matrix is $$\bar{\Sigma}_{o_s(k)} = \Sigma_{r_s(k)} + F'[z_0(k)] \Sigma_{z(k)} (F'[z_0(k)])^{Tr}, \quad (26)$$

or element-by-element:

$$p(o(k)|s(k)) = \prod_{j=1}^{J} \frac{1}{\sqrt{2\pi \sigma_{o_s(k)}(j)}} \exp\left\{-\frac{(o_k(j) - \mu_{o_s(k)}(j))^2}{2\sigma_{o_s(k)}(j)}\right\}. \quad (27)$$

This same algorithm can be applied to LPCC (Linear Predictive Coding Coefficients) and warped-LPCC. In the warped-LPCC case, the estimated vector of LPC cepstra $\hat{o}(k)$ needs to be warped.

Note that equation (27) calculates the likelihood of an observation frame. To calculate the likelihood score for the whole utterance, each phone segment can be modeled with a three-state HMM.

In the above implementation, the stiffness factor and the number of context frames D are pre-chosen. All other parameters can be trained automatically.

Lattice Rescoring Algorithm

The long-contextual-span nature of the HTM brings three difficulties to the decoder 212. First, the HTM likelihood of each observation frame depends on at least the phone hypothesis of left D frames and the right D frames. In most cases, it depends on many more frames since target values of phones such as cl and b depends on the phone follows them. A naïve calculation indicates that each frame can be expanded to about $60^{15}$ context dependent frames for a 60 phone system with D=7. Second, each frame may be dependent on a variable length of frames and a variable number of phones for different contexts. Third, the segment likelihood score can be calculated only when the phone boundary is available given the fact that an HMM model is used for each segment.

An A* based lattice rescoring algorithm is discussed below to evaluate HTM hypotheses. It is worth noting that the rescoring algorithm can be used with other models. For example, the models can be constructed of various linguistic units including, but not limited to phonemes, phones, words and/or combinations thereof. Additionally, lattice rescoring has the potential to evaluate more hypotheses and achieve better accuracy while providing the phone segment boundaries.

Phonetic Lattice

A lattice is an acyclic directed graph (N, A) with one start node !s and one end node !e, where N is the set of nodes, and A is the set of directed arcs. Each arc a in set A has a start node a.s and an end node a.e. A lattice can be considered as a compact representation of a very large N-best list. Since our long-contextual-span HTM is phone based, the rescoring is most naturally conducted on the phone lattice, however, rescoring can be extended to the word lattice. In one implementation of phone lattice search, a format is adopted such as the HTK lattice format. In this format, each node of the lattice consists of two elements: (w,t), where w is the identity of a phone, and t is the time stamp for the end time of phone w (which is the same as the start time of the next phone).

Figure 3:
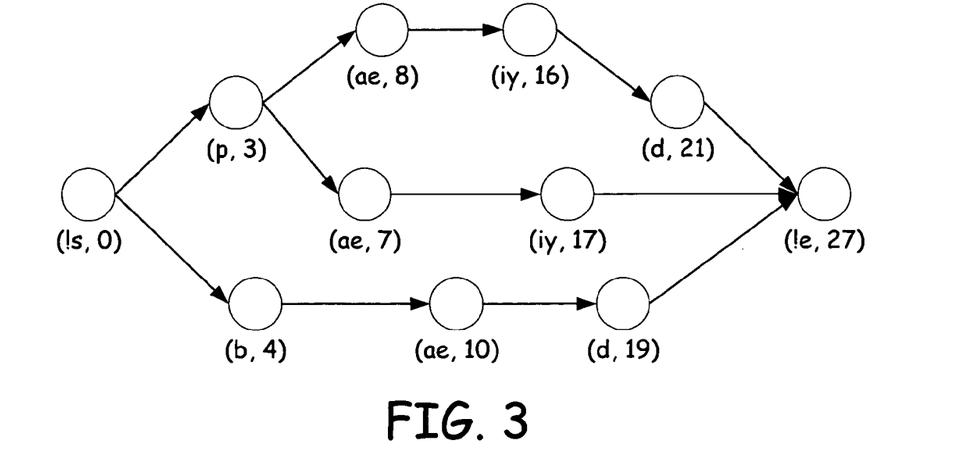
FIG. 3 is a diagram of a lattice having nodes representing the end frames of phones and arcs representing the duration of phones.

A partial phone-sequence hypothesis constrained by a lattice is a sequence of connected nodes (phones) starting from start-node !s. A phone-sequence hypothesis is complete if the sequence also ends at end-node !e. A partial hypothesis $h_1$ is called a prefix of another partial hypothesis $h_2$ if $h_1$ is the head of $h_2$, i.e., $h_2=h_1 \circ x$ for some node sequence x (where $\circ$ represents a concatenation). Two sequences with the same phone identities but with different phone boundaries can be considered as two different hypotheses, and thus follow two different paths in the lattice. In other words, a lattice can represent a sparse subset of all possible phone sequences with all possible phone ending times. FIG. 3 depicts an example of a very small phonetic lattice. Nodes are represented as circles and arcs are represented as arrows between the circles. As illustrated in FIG. 3, (ae,8) and (ae,7) are two different nodes in the lattice, and (!s,0)°(p,3)°(ae,8) and (!s,0)°(p,3)°(ae,7) are two different partial hypotheses. There are only three complete hypotheses in the lattice, i.e., (!s,0)○(p,3)○(ae,8)○(iy,16)○(d,21)○(!e,27),
(!s,0)○(p,3)○(ae,7)○(iy,17)○(!e,27), and
(!s,0)○(b,4)○(ae,10)○(d,19)○(!e,27).

Figure 4:
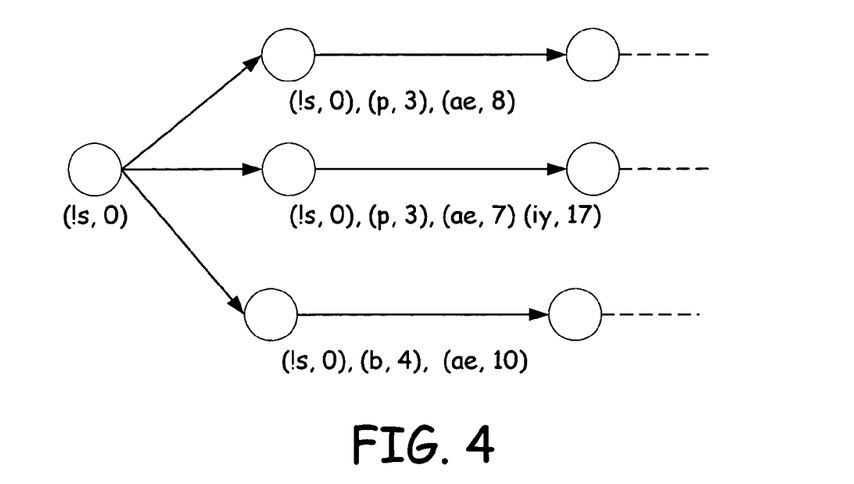
FIG. 4 is a diagram of a partial lattice wherein a node has been expanded into a variable-spanning context-dependent node (VSCD-node).

Lattices generated by a traditional HMM tri-phone model are rescored to identify a most likely path. It should be noted that the rescoring algorithm can be extended to other lattices. As mentioned earlier, in the long-span HTM, the score of each phone (arc) depends on the hypothesized VTR targets of at least past and future D frames. This score can include several phones in either temporal direction and the number of phones in the context is variable. In other words, the nodes and arcs in the original lattice only form part of the likelihood computation. In addition to the original lattice nodes, each node is converted into a set of variable-spanning context-dependent nodes (VSCD-node). Each VSCD-node is a triplet: $\{n_p, n_c, n_f\}$, where $n_p$ is a list of past nodes in the original lattice, $n_c$ is the center node under consideration, and $n_f$ is a list of future nodes in the original lattice. The number of nodes in $n_p$ and $n_f$ depends on the parameter D, which is a number of frames. As an illustrating example, if D=5, node (p,3) in FIG. 3 would be expanded into two VSCD-nodes:

{(!s,0), (p,3), (ae,8)} and
{(!s,0), (p,3), (ae,7)○(iy,17)}.

and the single arc from (!s,0) to (p,3) in FIG. 3 becomes two arcs as shown in FIG. 4.

In this expanded lattice, a VSCD-node $\{n_{1,p}, n_{1,c}, n_{1,f}\}$ has an arc to a VSCD-node $\{n_{2,p}, n_{2,c}, n_{2,f}\}$ if and only if there is an arc from $n_{1,f}$ to $n_{2,c}$ in the original lattice, and $n_{1,f}$ is a prefix of $n_{2,c} \circ n_{2,f}$ (which infers that $n_{2,c}$ is the first node in $n_{1,f}$). A partial hypothesis in the HTM thus can also be represented as a 2-tuplet: [hyp,$n_f$], where hyp is the partial hypothesis without context and $n_f$ is a list of future nodes, all represented as nodes in the original lattice. In other words, the HTM needs to look ahead to all phones in the $n_f$ to be able to calculate the likelihood score for the partial hypothesis hyp.

A* Search

The goal of the lattice search is to find a complete hypothesis whose log-likelihood score is the highest among all the complete hypotheses constrained by the lattice. In one implementation, the search over the expanded lattice is conducted using the one-stack A* search method described in relation to FIG. 5.

Figure 5:
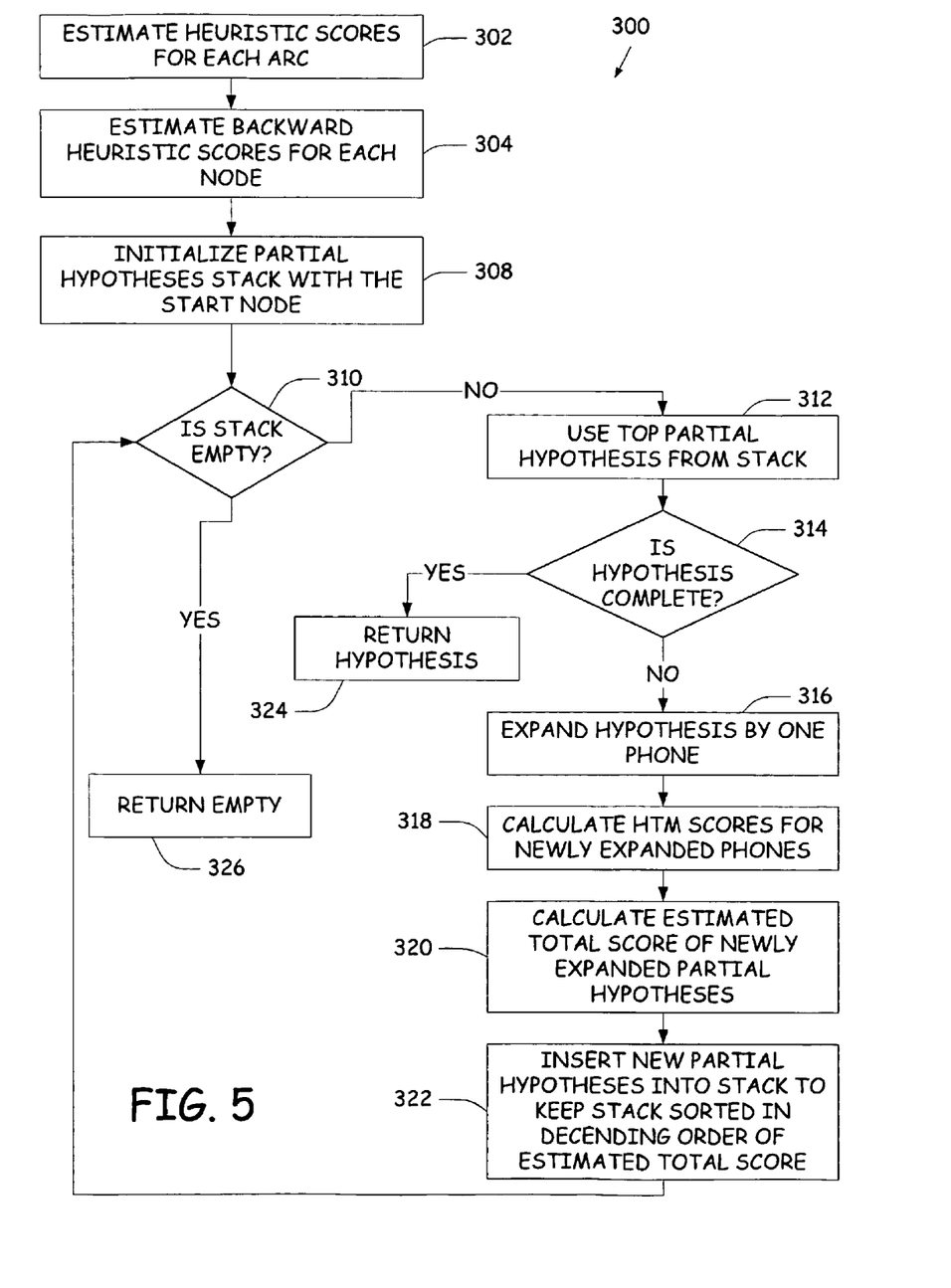
FIG. 5 is a flow diagram of a method for conducting a search over an expanded lattice.

Method 300 of FIG. 5 begins at step 302, wherein heuristic scores for each arc in the expanded lattice are estimated. At step 304, backward heuristic scores for each node in the expanded lattice are estimated. These scoring estimations are further discussed below. A stack of partial hypotheses is initialized with the start node in the lattice at step 308. The stack of partial hypotheses will then be evaluated to calculate a most likely complete hypothesis. As discussed below, several pruning strategies can be utilized to reduce the size of the stack and thus improve processing time.

Method 300 then moves to step 310 wherein a loop is created to evaluate each partial hypothesis in the stack. Step 310 determines whether the stack is empty. If the stack is not empty, method 300 proceeds to step 312, which uses the top partial hypothesis from the stack. At step 314, a determination is made of whether the hypothesis is complete. As discussed above, a complete hypothesis includes both the start node and the end node in the lattice.

If the hypothesis is not complete, method 300 moves to step 316, wherein the hypothesis is expanded by one phone. HTM scores for the new expanded phones are calculated at step 318 and the estimated total score of the newly expanded partial hypotheses are then calculated at step 320. New partial hypothesis are inserted into the stack to keep the stack sorted in descending order of estimated total score at step 322. Method 300 then returns to step 310. Thus, while the stack is not empty, method 300 will expand arcs along the best hypothesis until the end node has been reached. Then, the complete hypothesis is returned at step 324. When the stack is empty, method 300 proceeds to step 326, wherein an indication that the stack is empty will be returned.

An A* search method such as that described in relation to FIG. 5 can find the best hypothesis if the following two properties are satisfied:

Property 1: the estimated total score of a complete hypothesis is the true score.

Property 2: the estimated total score of a partial hypothesis is an upper bound of the true score of all the hypotheses whose prefix is the partial hypothesis.

If the estimated total score of a partial hypothesis is much larger than the best possible true score of all the hypotheses whose prefix is the partial hypothesis, then the estimation of the backward heuristic score would not provide useful information and the speed performance of an A* search would be low and be close to that of a breadth first search. On the other hand, if the estimated total score equals the best possible true score, the A* search will find the best complete hypothesis rapidly by expanding only the arcs along the best complete hypothesis.

Score Estimation

As indicated above, the performance of the A* search algorithm depends heavily on the quality of the estimated total score. In the long-contextual-span HTM, the true score of a complete hypothesis is the sum of log-likelihoods over all the phones in the hypothesis as indicated in equation (28):

$$S = \sum_{i=1}^{N} S_i, \quad (28)$$

Where $S_i$ is the log-likelihood of the i-th phone in the hypothesis, and N is the total number of phones in the hypothesis. When we only have a partial hypothesis, the total score S can be estimated as:

$$\hat{S} = S_p + H_n, \quad (29)$$

Where $S_p$ is the log-likelihood score of the partial hypothesis, and $H_n$ is the backward heuristic score associated with the final node n (phone) in the partial hypothesis. These scores are used to maintain the stack at step 306. The quality of the score estimation using equation (29) depends on the quality of the heuristic score $H_n$.

Figure 6:
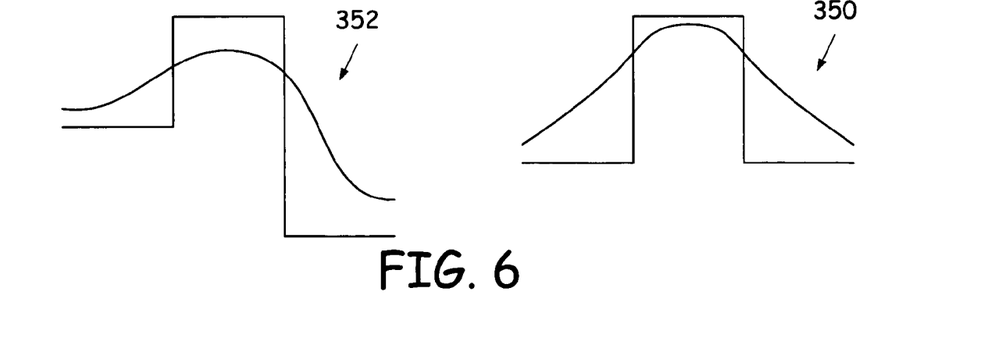
FIG. 6 is a diagram of a signal with a realistic context and a generic context.

To make sure the backward heuristic score is a good estimate of the true backward score, a score computation algorithm can be used. In the long-span HTM based on bi-directional target filtering, the true score of each phone $S_a$, associated with an arc in the lattice, is a function of both the past and future VTR targets. This situation makes it very expensive to use the true future score as the heuristic score $H_n$ in equation (29). The true score can be estimated by using the same formula for the true HTM score but without considering the adjacent phone context. Note that the heuristic score obtained in this way may be lower than the true score. This is especially true for the correct phone hypotheses in phone context since the omission of the phone context information is likely to increase the mismatch between the acoustic signal and the hypothesis. This situation is shown in FIG. 6, where a generic context 350 is used to replace a realistic context 352. The generic context takes the form of neutral VTR targets which is independent of the adjacent phones. To compensate for the lowering of the score caused by this approximation, the heuristic score can be adjusted by adding a fixed, small score for each frame so that the heuristic score will highly likely satisfy Property 2 discussed above.

Figure 7:
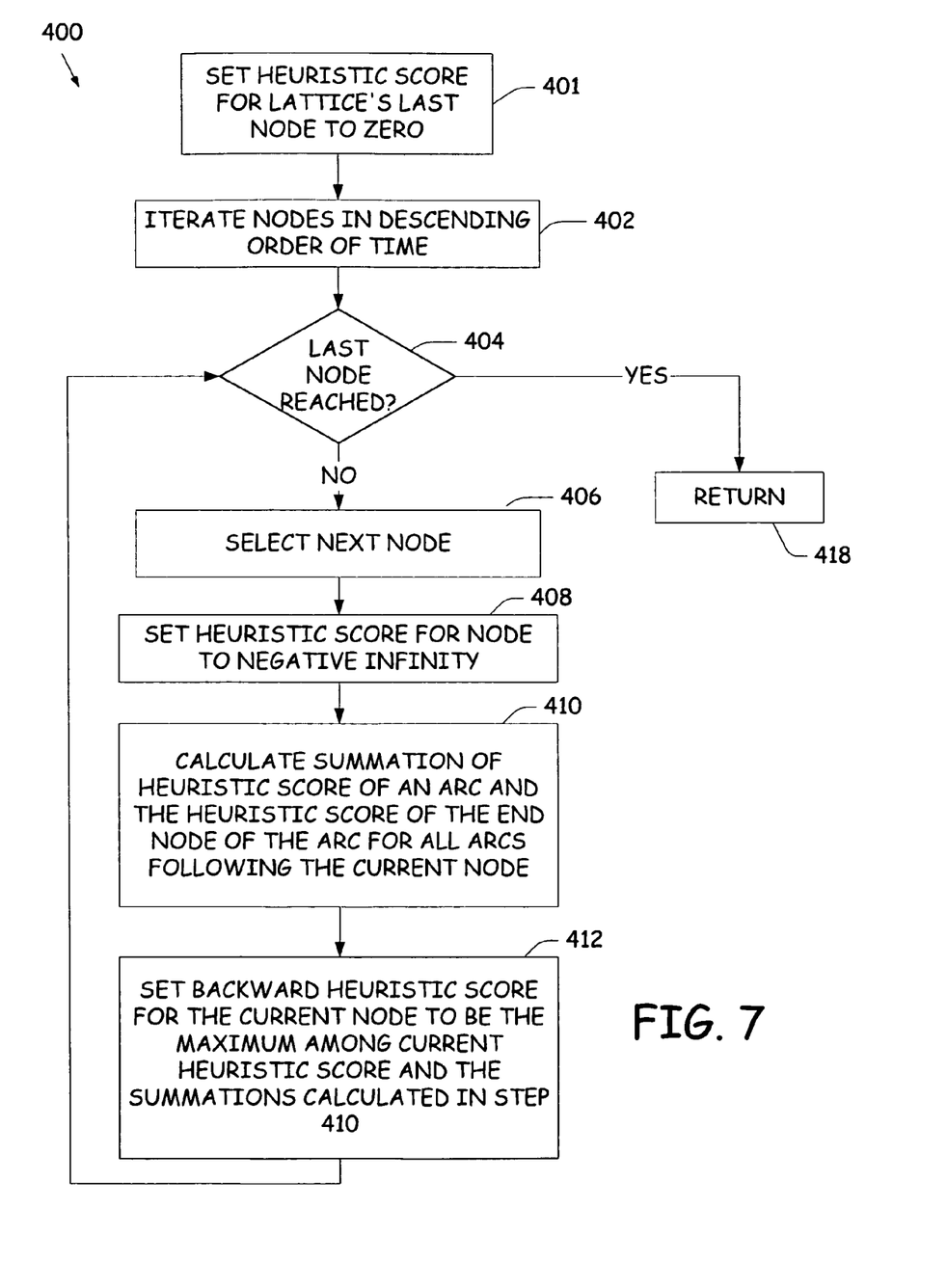
FIG. 7 is a flow diagram of a method for calculating backward heuristic scores of nodes in a lattice.

Once the heuristic scores of all the phones (arcs) $H_a$ in the lattice have been calculated at step 302, the backward heuristic scores of each node $H_n$ can be calculated at step 304. To satisfy Property 2, $H_n$ should be the best score along all possible paths starting from node n to the end. FIG. 7 describes a method for calculating the backward heuristic scores $H_n$. The calculation of $H_a$ and $H_n$ incurs very small computational cost.

Figure 8:
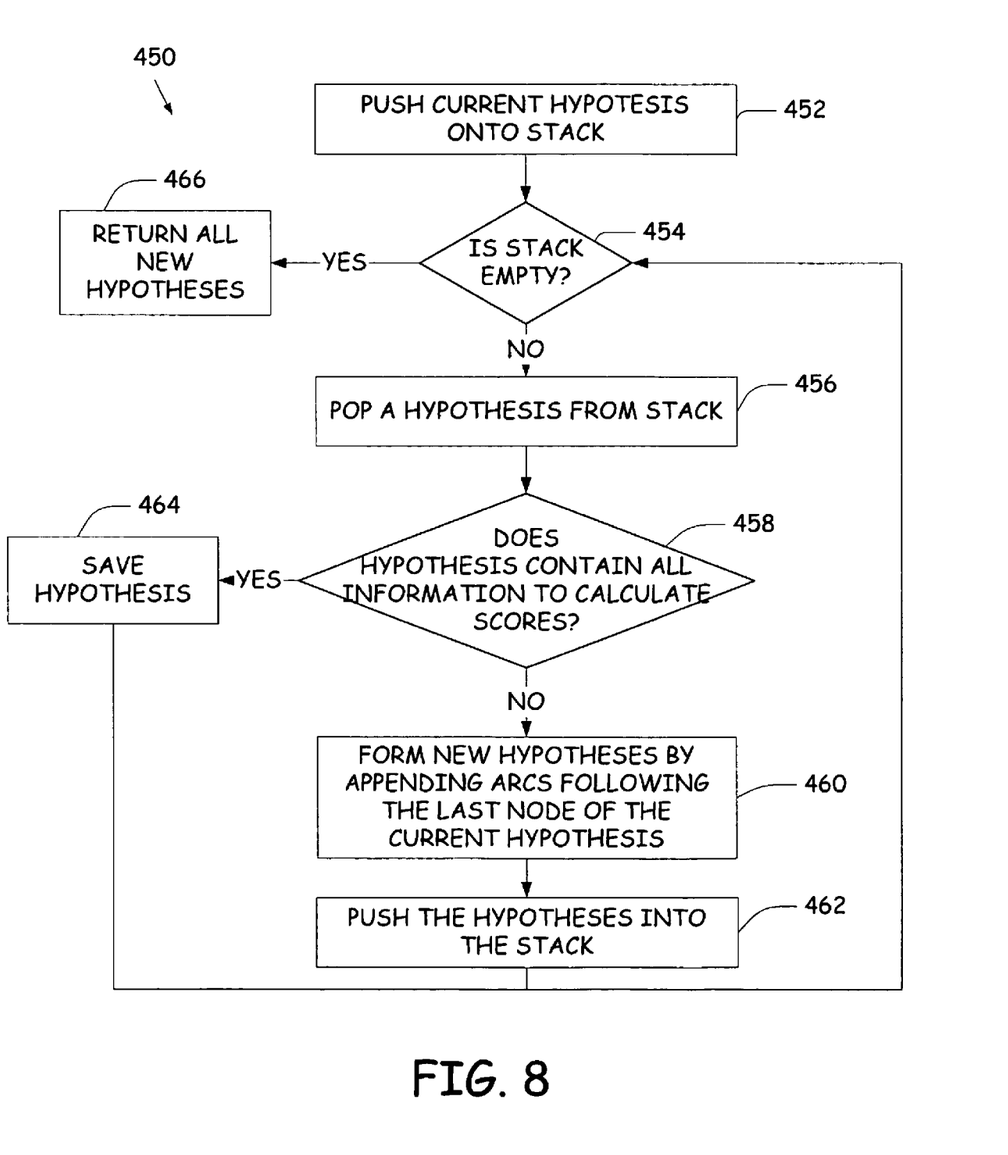
FIG. 8 is a method for expanding hypotheses in a lattice.

FIG. 7 illustrates method 400 that begins at step 401, wherein the heuristic score for the lattice's last node is set to zero. At step 402, nodes are iterated in descending order of time. Method 400 then enters a loop to calculate heuristic scores for the nodes. Step 404 determines whether or not the last node in the lattice has been reached. If the last node has not been reached, method 400 proceeds to step 406 wherein the next node in the list produced by step 402 is selected. At step 408, the heuristic score for the node is set to a low number, for example negative infinity. At step 410, summation of the heuristic score of an arc and the heuristic score of the end node of the arc for all arcs following the current node is calculated. At step 412, the backward heuristic score is set for the current node as the maximum among the current heuristic score and the summations calculated in step 410. Method 400 then returns to step 404 until all nodes have a heuristic score and the last node is reached. When the last node is reached, method 400 proceeds to step 418, the method is returned Hypothesis Expansion One of the steps in A* search is expansion of the hypotheses. This expansion needs to be done in the expanded lattice (at the VSCD-node level). However, given the fact that a partial hypothesis in the HTM can be represented as a 2-tuplet: [hyp,$n_f$], where hyp is the partial hypothesis without context and $n_f$ is a list of future nodes, all represented as nodes in the original lattice, a partial hypothesis can be expanded by directly traversing the original lattice according to the method described in FIG. 8. A new hypothesis [hyp○a.e,$n_h$] can be derived from the old hypothesis [hyp,$n_f$] using:

$$S_{p,new} = S_{p,hyp} + S_a \quad (30)$$

FIG. 8 illustrates method 450, which begins at step 452 wherein the current hypothesis (the hypothesis to be expanded) is pushed onto a stack. At step 454, a determination is made as to whether the stack is empty. When the stack is not empty, a hypothesis is popped from the stack. Then, at step 458, it is determined whether the hypothesis contains all information needed to calculate scores for the hypothesis. If the hypothesis needs further information to calculate scores, new hypotheses are formed by appending arcs following the last node of the current hypothesis at step 460. These hypotheses are pushed on the stack at step 462. If the hypothesis does contain all the information needed to calculate the scores, the hypothesis is saved at step 464. After steps 462 and 464, method 450 returns to step 454 to determine if the stack is empty. When the stack is empty, method 450 proceeds to step 466, wherein all new hypotheses are returned.

Speed Up Strategies

The lattice rescoring can be very slow (depending on the size of the lattice) and can consume a large amount of memory given a large number of possible expansions in the HTM. Several strategies can be used to speed up the rescoring process.

Score Caching

Many times, the partial hypotheses are different but the VSCD-nodes contained in these hypotheses may have the same phone list and boundaries. Since the log-likelihood of a phone in the model depends on the phone list and corresponding boundaries in the VSCD-node {$n_p$, $n_c$, $n_f$}, phone scores can be cached (or stored) in a hash table to avoid re-computation. The hash value can be derived from a VSCD-node's fingerprint, which is consisted of the concatenated pairs of phoneID:frameNumber for each node in the VSCD-node with an additional number indicating the location of $n_c$ in the VSCD-node. Score caching can eliminate about 80% of the calculation in some instances.

Heuristic Score Beam Pruning

Beam pruning is a strategy used in large vocabulary continuous speech recognition (LVCSR) decoders. The basic idea of beam pruning is to retain only paths with a likelihood score close to the best partial path hypothesis. However, this strategy can not be directly applied to time-asynchronous decoders since partial hypotheses in the time-asynchronous decoders contain a different number of frames.

The heuristic score of the true hypothesis is generally not very far away from the best heuristic score in the lattice, since the heuristic scores are still based on the HTM scores, except without specific context information. For this reason, those hypotheses whose heuristics are much lower than the best hypothesis in the lattice can be pruned, eliminating the expansion and evaluation of these hypotheses. This pruning step can be done before A* search starts. More formally, the best forward heuristic score of a node n can be defined as:

$$H_n^f = \max_{a.endN=n} (H_a + H_{a.startN}^f), \quad (31)$$

Where $H_a$ is the heuristic score of arc a, and $H_{a.startN}^f$ is the forward heuristic score of node a.startN. The search algorithm can prune out all nodes and corresponding arcs that:

$$H_a + H_{a.startN}^f < f_{beam} \circ H_n^f, \quad (32)$$

Where $f_{beam}$ is the threshold that determines the beam width.

Similarly, the best backward heuristic score of a node n can be defined as:

$$H_n^b = \max_{a.startN=n} (H_a + H_{a.endN}^b), \quad (33)$$

and prune the nodes and arcs backwards.

Histogram Pruning

Histogram pruning is another common pruning strategy. The basic idea of histogram pruning is to limit the number of active partial hypotheses at each step by retaining only a predefined number of best paths. In other words, the search algorithm sorts the partial hypotheses in the stack in the descending order of the estimated total likelihood scores $\hat{S}(h)$. The partial hypothesis h is pruned out if:

$$Pos(h) > N_{hist} \cap \hat{S}(h) \neq \hat{S}(h_i) \forall i \leq N_{hist}, \quad (34)$$

where Pos(h) is the position of the hypothesis h in the stack, and $N_{hist}$ is histogram pruning threshold.

Histogram pruning is more likely to prune out the best path than the beam pruning. For this reason, histogram pruning is mainly used to limit the stack size. The histogram pruning threshold can be determined based on the worst case processing time for decoding and the memory available.

Merge Pruning

When several partial hypotheses join at the same VSCD-node, the hypothesis with the highest partial score (or the highest estimated total score since the heuristic part would be the same) can be kept, while others are discarded. This pruning strategy is based on the fact that complete hypotheses expanded from other partial hypotheses will not have a higher score than the complete hypothesis expanded from the partial hypothesis with the highest partial score. More formally, the search algorithm can prune out all hypotheses $h_i$ that satisfy:

$$\hat{S}(h_i) < \max_{h_i.endN=h_j.endN} (\hat{S}(h_j)), \quad (35)$$

where $\hat{S}(h_i)$ and $h_{i.endN}$ are the estimated total score and the end VSCD-node of the hypotheses $h_i$ respectively.

Prefix Pruning

The output of the decoder is a phone sequence without boundary information. In other words, boundary information can be ignored during the pruning process and hypotheses with the same phone sequence but different boundaries can be considered the same. Thus, only two partial hypotheses need to be kept: 1) with the highest partial score, and 2) with the highest estimated total score in the stack, among all having the same phone sequence and ending frame number but different boundaries. (These hypotheses do not need to merge at the same VSCD-node.) This pruning strategy is called prefix pruning since the hypotheses pruned out have the same prefix phone list.

Unlike the merging pruning, prefix pruning may lose accuracy since different hypotheses with the same prefix may link to different sets of future nodes which usually provide different scores for the future frames. The reason to prune only those hypotheses with the same ending frame number is to make sure the scores are comparable. The reason to keep both the hypotheses with the highest partial score and the highest estimated total score is to reduce the probability that the best path is pruned out by the prefix pruning.

Unseen Phone Bi-gram Pruning

The basic idea behind the unseen phone bi-gram pruning is that the correct hypothesis is very unlikely to contain a large percentage of unseen phone bi-grams. This pruning strategy can be applied in the hypothesis expansion step. The search algorithm can not put a newly generated partial hypothesis to the A* stack if the percentage of unseen bi-grams in the hypothesis exceeds a specific threshold. In other words, the search algorithm prunes out the partial hypothesis h if:

$$\frac{B_u(h)}{B_t(h)} > \theta_u \cap B_t(h) > U_{min}, \quad (36)$$

Where $B_u(h)$ is the number of unseen bi-grams in the hypothesis h, $B_t(h)$ is the total number of bi-grams in the hypothesis, $\theta_u$ is the pruning threshold (in percentage, e.g., 10%), and $U_{min}$ is the minimum number of bi-grams in the hypothesis before the unseen phone bi-gram pruning strategy is applied.

The bi-gram dictionary is obtained from the training set and stored in the prefix format. The larger the threshold, the less effect the pruning has, and the higher chance that the best hypothesis will not be pruned out. The pruning threshold $\theta_u$ can be tuned using a held-out set.

The concepts provided above evaluate a long-span HTM. In particular, the HTM score for each frame is determined by model parameters associated with a variable number of adjacent phones, which in theory could reach the beginning and end of the utterance. The challenge due to such unique long-contextual-span modeling is addressed via A* search, using carefully designed and implemented pruning strategies. These concepts can also be applied to other models.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of processing speech using a computer with a processor, comprising:

receiving a speech signal;

generating, with the processor, a lattice having a plurality of possible sequences, each sequence having a plurality of nodes representing a plurality of hypothesized linguistic units and transitions connecting the linguistic units for the received speech signal;

converting, with the processor, each of the plurality of nodes to an expanded node such that each expanded node is representative of previous nodes in the sequence and future nodes in the sequence;

generating, with the processor, scores for each of the plurality of expanded nodes;

storing the scores for the expanded nodes;

identifying, with the processor, a second expanded node in the lattice that has similar previous nodes and similar future nodes to a given one of the expanded nodes;

generating a score for the second expanded node using the stored score for the given one of the expanded nodes;

generating scores for each possible sequence in the plurality of possible sequences based on the scores for the expanded nodes and the second expanded node;

comparing, with the processor, the scores for each possible sequence; and determining, with the processor, a best possible sequence from the plurality of possible sequences based on the scores for each possible sequence.

2. The method of claim 1 wherein the linguistic units include phones.

3. The method of claim 1 wherein the scores for the transitions nodes are based on heuristic scores from a hidden trajectory model.

4. A speech recognizer, comprising:

an acoustic model generating a lattice representing a plurality of possible sequences of hypothesized linguistic units and transitions connecting the linguistic units for a speech signal, each lattice having a plurality of sequences of nodes representing the hypothesized linguistic units and a plurality of arcs between the nodes representing the transitions in the possible sequence of hypothesized linguistic units;

a decoder coupled to the acoustic model, converting each of the plurality of nodes to an expanded node, each expanded node representing previous nodes in a sequence of nodes and future nodes in the sequence of nodes and generating scores for transitions between linguistic units in the plurality of possible sequences, generating scores for the linguistic units based on the scores of previous transitions in the sequence, generating scores for each possible sequence in the plurality of possible sequences based on the scores for the linguistic units in each possible sequence and comparing the scores for each possible sequence; and wherein generating scores for transitions, generating scores for the linguistic units, and generating scores for each possible sequence comprises:

generating a score for each expanded node;

storing scores for each expanded node;

identifying a set of second expanded nodes in the lattice, each second expanded node having similar previous nodes and future nodes to an associated one of the expanded nodes;

for each given second expanded node, using the stored score for the associated expanded node to score the given second expanded node; and a computer processor, activated by the decoder, facilitating generation of scores.

5. The recognizer of claim 4 wherein the decoder further determines a best possible sequence from the plurality of possible sequences based on the scores for each possible sequence.

6. The recognizer of claim 4 wherein the linguistic units include phones.

7. The recognizer of claim 4 wherein the acoustic model comprises a hidden trajectory model and wherein scores for the transitions are based on heuristic scores from the hidden trajectory model.

8. A computer-implemented method of processing a model using a computer with a processor, comprising:

accessing, with the processor, a lattice having a plurality of possible sequences, each sequence having a plurality of nodes representing linguistic units and a plurality of arcs representing transitions between the linguistic units; and converting, with the processor, each of the plurality of nodes for each sequence in the lattice to an expanded node such that each expanded node includes an indication of previous nodes in the sequence and an indication of future nodes in the sequence;

generating a score, with the processor, for a given expanded node;

storing the score, with the processor, for the given expanded node;

identifying, with the processor, a second expanded node in the lattice that has similar previous nodes and similar future nodes to the given expanded node; and using the stored score for the given expanded node to score, with the processor, the second expanded node.

9. The method of claim 8 and further comprising:

generating scores for the plurality of arcs; and generating scores for each of the plurality of nodes based on the scores for arcs that are before the node in a respective sequence including the node.

10. The method of claim 8 and further comprising:

generating scores for the plurality of possible sequences based on expanded nodes in the sequence; and comparing the scores for the plurality of nodes to identify a best possible sequence from the plurality of possible sequences.

11. The method of claim 8 and further comprising:

identifying at least one possible sequence having a score below a threshold; and removing the at least one possible sequence from the lattice.

12. The method of claim 8 wherein converting comprises identifying previous nodes in the sequence within a time period and future nodes in the sequence within the time period.

13. The method of claim 8 wherein the linguistic nodes are phones.

* * * * *